(No Model.)

E. G. DORCHESTER.
BICYCLE TIRE.

No. 468,560. Patented Feb. 9, 1892.

WITNESSES:
J. J. Laass
Mark W. Dewey

INVENTOR:
Edward G. Dorchester
By Dudly, Laass & Dull
his ATTORNEYS.

UNITED STATES PATENT OFFICE.

EDWARD G. DORCHESTER, OF GENEVA, NEW YORK.

BICYCLE-TIRE.

SPECIFICATION forming part of Letters Patent No. 468,560, dated February 9, 1892.

Application filed October 26, 1891. Serial No. 409,820. (No model.)

*To all whom it may concern:*

Be it known that I, EDWARD G. DORCHESTER, of Geneva, in the county of Ontario, in the State of New York, have invented new and useful Improvements in Bicycles, of which the following, taken in connection with the accompanying drawings, is a full, clear, and exact description.

This invention relates to the attachment of the pneumatic tire to the rim of a bicycle-wheel.

The object of my present invention is to provide more effective and more convenient means for securing the tire to the wheel-rim and which shall also permit of readily detaching the tire or its sheath when desired for repairs or renewal. To attain this object I attach to the inner side of the wheel-rim either staples or eye-studs or hooks or other suitable fastenings adapted to receive and retain a lacing, which staples or their said equivalents project through the marginal portions of the sheath lapped onto the inner side of the tire, and a lacing passing through the protruding portions of the aforesaid staples or other fastenings, and thereby retaining the sheath on the wheel-rim, all as hereinafter more fully described, and specifically set forth in the claims.

Figure 1:
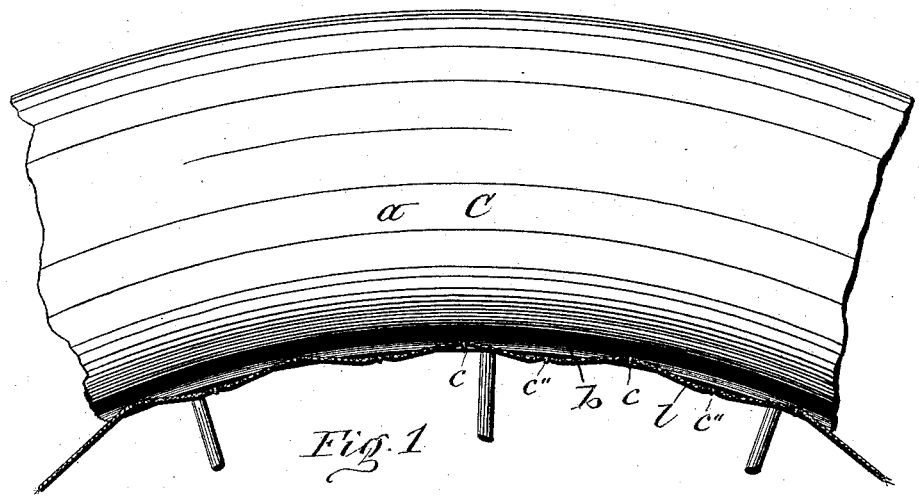
Figure 2:
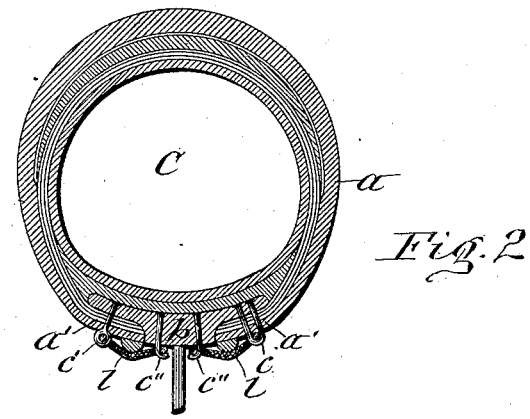
Figure 3:
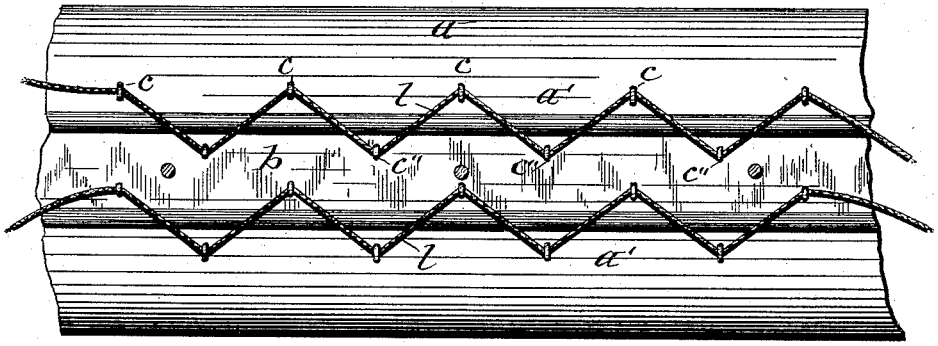

In the annexed drawings, Figure 1 is a side view of a section of a wheel embodying my invention. Fig. 2 is a transverse section of the same, and Fig. 3 is a plan view of the inner side of the wheel-rim with the sheath fastened thereto.

Similar letters of reference indicate corresponding parts.

$b$ represents the rim of the wheel, C the pneumatic tire, and $a$ the sheathing of said tire. The marginal portions of said sheathing are lapped onto the inner side of the tire, as shown at $a'$ in Fig. 2 of the drawings, and are secured thereto by means of either staples or eye-studs or hooks, as shown, respectively, at $c\ c'$ and $c''$, or other suitable fastening devices adapted to receive and retain a lacing. These fastening devices are rigidly secured to the inner side of the wheel-rim and are disposed in rows extending lengthwise of the rim $b$, preferably two rows at each side of the center of the width of the rim. The outer staples or aforesaid equivalent fastening devices pass through the lapping portions of the sheath $a$, and lacings $l\ l$, of either stout leather or cord or wire or other suitable material, pass alternately through the protruding portions or eyes of the outer staples or their equivalents and through or around the inner fastening devices, and by drawing said lacings taut and tying them they are caused to securely hold the sheathing $a$ on the rim $b$. I preferably reinforce the edges of the sheathing, as shown at $a'$. The lacing passing across said reinforced edges holds the same compactly against the rim $b$. The sheathing can be readily removed from the tire and the latter may be removed from the rim when desired for repairs or renewal by simply untying the lacing and throwing it off from the hooks $c''\ c''$ and withdrawing it from the staples or eye-studs $c\ c'$. The sheathing can then be thrown off from the fastening devices which pass through it.

Having described my invention, what I claim as new, and desire to secure by Letters Patent, is—

1. The combination, with the wheel-rim and sheathing lapping onto said rim, of staples or their described equivalents secured to the wheel-rim and projecting through the sheathing, and a lacing passing through the protruding portions of the eyes, as and for the purpose set forth.

2. The combination, with the wheel-rim and sheathing lapping thereon, of staples or their described equivalents secured to the inner side of the rim and in two rows lengthwise thereof and at each side of the center of its width, those of the outer rows passing through the lapping portions of the sheath, and lacings passing alternately through the outer and inner staples or aforesaid equivalents, substantially as described and shown.

In testimony whereof I have hereunto signed my name this 17th day of October, 1891.

EDWARD G. DORCHESTER. [L. S.]

Witnesses:
MARK W. DEWEY,
H. M. SEAMANS.